(12) United States Patent
Thompson

(10) Patent No.: US 9,157,703 B2
(45) Date of Patent: Oct. 13, 2015

(54) TRANSPARENT ARMOR STRUCTURE

(75) Inventor: William T. Thompson, Lakeville, IN (US)

(73) Assignee: AM General LLC, South Bend, IN (US)

( * ) Notice: Subject to any disclaimer, the term of this patent is extended or adjusted under 35 U.S.C. 154(b) by 297 days.

(21) Appl. No.: 13/433,414

(22) Filed: Mar. 29, 2012

(65) Prior Publication Data

US 2014/0013932 A1    Jan. 16, 2014

Related U.S. Application Data

(60) Provisional application No. 61/470,727, filed on Apr. 1, 2011.

(51) Int. Cl.
*B32B 17/10* (2006.01)
*F41H 5/04* (2006.01)
*F41H 5/02* (2006.01)

(52) U.S. Cl.
CPC ........ *F41H 5/0407* (2013.01); *B32B 17/10045* (2013.01); *B32B 17/1077* (2013.01); *B32B 17/10293* (2013.01); *F41H 5/023* (2013.01); *Y10T 428/24479* (2015.01); *Y10T 428/24562* (2015.01)

(58) Field of Classification Search
USPC ...................................................... 428/195.1
See application file for complete search history.

(56) References Cited

U.S. PATENT DOCUMENTS

| | | | |
|---|---|---|---|
| 2,318,301 A | 5/1943 | Eger | |
| 2,399,691 A | 5/1946 | Partiot | |
| 3,380,406 A | 4/1968 | Gosnell | |
| 3,624,238 A | 11/1971 | McKenzie | |
| 3,630,814 A | 12/1971 | Arnold | |
| 3,684,631 A | 8/1972 | Dunbar | |
| 3,765,299 A | 10/1973 | Pagano et al. | |
| 3,781,524 A | 12/1973 | Levin | |
| 3,825,917 A | 7/1974 | Lucky | |
| 3,825,919 A | 7/1974 | Levin et al. | |
| 3,864,204 A | 2/1975 | Shorr et al. | |
| 3,917,891 A | 11/1975 | Cooke et al. | |
| 3,930,452 A | 1/1976 | Van Laethem et al. | |
| 3,974,316 A | 8/1976 | Jacquemin et al. | |
| 4,067,764 A | 1/1978 | Walker et al. | |
| 4,106,398 A | 8/1978 | Buisson | |

(Continued)

FOREIGN PATENT DOCUMENTS

DE    1596973        7/1970
FR    817596 A1  *  9/1937

(Continued)

OTHER PUBLICATIONS

Machine Translation of FR817596 Retreived on Jun. 30, 2014.*

(Continued)

*Primary Examiner* — Gerard Higgins
*Assistant Examiner* — Christopher Polley
(74) *Attorney, Agent, or Firm* — Barnes & Thornburg LLP

(57) ABSTRACT

A transparent armor structure includes a layer having a first planar surface and a second planar surface of substantially the same configuration as the first planar surface. The second planar surface is located opposite the first planar surface and oriented such that it is not parallel to the first planar surface and such that corresponding locations on the first and second planar surfaces are displaced approximately 90 degrees from each other.

22 Claims, 6 Drawing Sheets

(56) References Cited

U.S. PATENT DOCUMENTS

| | | |
|---|---|---|
| 4,130,684 A | 12/1978 | Littell, Jr. et al. |
| 4,594,290 A | 6/1986 | Fischer et al. |
| 4,633,528 A | 1/1987 | Brandt |
| RE32,406 E | 4/1987 | Molari, Jr. |
| 4,747,896 A | 5/1988 | Anastasie |
| 4,774,143 A | 9/1988 | Gondela et al. |
| 4,901,622 A | 2/1990 | Perry |
| 5,013,134 A | 5/1991 | Smith |
| 5,229,204 A | 7/1993 | Labock |
| 5,443,912 A | 8/1995 | Olson |
| 5,452,641 A | 9/1995 | Kariya |
| 5,468,559 A | 11/1995 | Solinov et al. |
| 5,487,323 A | 1/1996 | Madden, Jr. |
| 5,496,643 A | 3/1996 | Von Alpen |
| 5,506,037 A | 4/1996 | Termath |
| 5,506,057 A | 4/1996 | Olson |
| H1567 H | 8/1996 | Parsons et al. |
| 5,567,529 A | 10/1996 | Smith |
| 5,747,159 A | 5/1998 | Labock |
| 5,747,170 A | 5/1998 | Von Alpen et al. |
| 5,932,045 A | 8/1999 | Campbell et al. |
| 5,962,617 A | 10/1999 | Slagel |
| 6,009,790 A | 1/2000 | Tekorius |
| 6,127,505 A | 10/2000 | Slagel |
| 6,334,382 B2 | 1/2002 | Gourio |
| 6,357,332 B1 | 3/2002 | Vecchio |
| 6,565,980 B1 | 5/2003 | Ackermann |
| 6,630,235 B2 | 10/2003 | Oshima et al. |
| 6,708,595 B1 | 3/2004 | Chaussade et al. |
| 6,845,701 B2 | 1/2005 | Drackett |
| 6,931,166 B2 | 8/2005 | Gauthier, Jr. et al. |
| 7,080,807 B2 | 7/2006 | Olson et al. |
| 7,118,070 B2 | 10/2006 | Abrams et al. |
| 7,146,899 B2 | 12/2006 | Imblum et al. |
| 7,163,731 B2 | 1/2007 | Yeshurun et al. |
| 7,197,197 B2 | 3/2007 | Gauthier, Jr. et al. |
| 7,232,181 B2 | 6/2007 | Schmucker |
| 7,318,956 B2 | 1/2008 | Labock |
| 7,452,608 B2 | 11/2008 | Fukatani et al. |
| 7,641,965 B1 | 1/2010 | Bennison et al. |
| 7,670,685 B2 | 3/2010 | Bayya et al. |
| 7,732,042 B2 | 6/2010 | Fukatani et al. |
| 7,794,818 B2 | 9/2010 | Travis et al. |
| 7,866,248 B2 | 1/2011 | Moore, III et al. |
| 7,908,958 B2 | 3/2011 | Mandelartz et al. |
| 7,919,175 B2 | 4/2011 | Bennison et al. |
| 7,926,407 B1 | 4/2011 | Hallissy et al. |
| 7,938,053 B1 | 5/2011 | Dudt et al. |
| 8,028,612 B2 | 10/2011 | Neal |
| 8,088,472 B2 | 1/2012 | Mannheim Astete et al. |
| 8,297,168 B2 | 10/2012 | Jones et al. |
| 8,534,179 B2 | 9/2013 | Zachau et al. |
| 8,898,966 B2 | 12/2014 | Bar |
| 8,985,001 B2 | 3/2015 | Hunn et al. |
| 2003/0221547 A1 | 12/2003 | Peretz |
| 2004/0053006 A1 | 3/2004 | Omizu et al. |
| 2006/0027090 A1 | 2/2006 | Gonzalez |
| 2006/0065111 A1 | 3/2006 | Henry |
| 2008/0176043 A1* | 7/2008 | Masaki et al. ............... 428/172 |
| 2008/0187721 A1 | 8/2008 | Engl |
| 2008/0264548 A1 | 10/2008 | Zhang |
| 2009/0068453 A1 | 3/2009 | Chung |
| 2009/0136702 A1 | 5/2009 | Gu |
| 2009/0255448 A1 | 10/2009 | Loomis et al. |
| 2009/0263651 A1 | 10/2009 | Cook |
| 2009/0311523 A1 | 12/2009 | Friedman |
| 2010/0024633 A1 | 2/2010 | Piscitelli |
| 2010/0300276 A1 | 12/2010 | Justamon |
| 2011/0100205 A1 | 5/2011 | Briola |
| 2011/0308381 A1* | 12/2011 | Hartley ..................... 89/36.02 |

FOREIGN PATENT DOCUMENTS

| | | |
|---|---|---|
| GB | 2308401 A | 6/1997 |
| WO | 9112483 A1 | 8/1991 |
| WO | 2010039321 A2 | 4/2010 |
| WO | 2012039803 A1 | 3/2012 |

OTHER PUBLICATIONS

European Patent Office, International Preliminary Report on Patentability issued in a corresponding patent application, Oct. 1, 2013, 11 pages.

European Patent Office, International Search Report issued in a corresponding patent application, Jun. 18, 2012, 4 pages.

European Patent Office, Written Opinion of the International Searching Authority issued in a corresponding patent application, Jun. 18, 2012, 10 pages.

* cited by examiner

TRANSPARENT ARMOR STRUCTURE

FIELD OF THE INVENTION

The present invention relates to ballistic products and, in particular, a transparent armor structure.

BACKGROUND AND SUMMARY OF THE INVENTION

Various types of transparent armoring products are known. Examples of such products are shown in U.S. Pat. No. 3,380,406, U.S. Pat. No. 3,624,238 and U.S. Pat. No. 4,594,290. Transparent armoring products are useful in various environments in which it is desirable to protect personnel from bullets, shrapnel and other projectiles while at the same time permitting personnel to see through the protective structure. For example, transparent armoring products can be utilized by banks at drive-up teller windows. Transparent armoring products are also useful in mobile applications. For example, transparent armoring products can be used instead of traditional glass on military vehicles. This permits the vehicle driver and occupants to directly observe the environment outside the vehicle while protecting them from bullets, shrapnel and other projectiles. Depending on the weight of the transparent armoring products, they can also be useful for personal protection devices such as face shields for police officers or military personnel.

In one embodiment of the present invention, a transparent armor structure includes a first layer of a first material, a second layer of a second material, the second layer positioned adjacent to the first layer, a third layer of a third material, an air gap between the second and third layers, a fourth layer of the second material, the fourth layer positioned adjacent to the third layer, a fifth layer of the third material, the fifth layer positioned adjacent to the fourth layer, a sixth layer of the second material, the sixth layer positioned adjacent to the fifth layer, a seventh layer of the third material, the seventh layer positioned adjacent to the sixth layer, an eighth layer of the second material, an air gap between the seventh and eighth layers and a ninth layer of a fourth material, the ninth layer positioned adjacent to the eighth layer. The third layer includes a first surface, a second surface opposite the first surface and four edges extending between the first and second surfaces. The first and third edges have constant thicknesses and are disposed opposite each other. The thickness of the third edge is less than the thickness of the first edge. The second and fourth edges are disposed opposite each other. The fifth layer includes a first surface, a second surface opposite the first surface and four edges extending between the first and second surfaces. The first edge is located opposite the third edge and the second edge is located opposite the fourth edge. All four edges have varying thicknesses. The seventh layer includes a first surface, a second surface opposite the first surface and four edges extending between the first and second surfaces. The first and third edges have constant thicknesses and are disposed opposite each other. The thickness of the third edge is less than the thickness of the first edge. The second and fourth edges are disposed opposite each other. In one embodiment, the first material is a first type of glass and the second material is a second type of glass. In another embodiment, the third material is a polyurethane. According to another embodiment of the invention, the fourth material is a polycarbonate.

In another embodiment of the present invention, the thickness of the first edge of the third layer is substantially the same as the thickness of the first edge of the seventh layer. In another embodiment, the first edge of the seventh layer is oriented at a 90 degree angle with respect to the first edge of the third layer. The first edge of the seventh layer can be oriented at a 90 degree angle with respect to the first edge of the fifth layer. According to another embodiment of the invention, the dimensions of the third layer are substantially the same as the dimensions of the seventh layer and the combined thickness of the first edge of the third layer, the first edge of the fifth layer and the fourth edge of the seventh layer is constant when the first edge of the third layer is parallel to the first edge of the fifth layer and the first edge of the seventh layer is disposed at a 90 degree angle to the first edge of the third layer.

In yet another embodiment of the invention, the second surface of the third layer faces the first surface of the fifth layer and is parallel to the first surface of the fifth layer, the second surface of the fifth layer faces the first surface of the seventh layer and is parallel to the first surface of the seventh layer and the first surface of the third layer is parallel to the second surface of the seventh layer.

In another embodiment of the present invention, a transparent armor structure includes first, second and third layers. The first layer has a first surface, a second surface opposite the first surface and four edges extending between the first and second surfaces. The first and third edges are opposite each other and are of constant thickness along their lengths, with the thickness of the first edge being greater than the thickness of the third edge. The second and fourth edges are opposite each other and vary in thickness along their lengths. The second layer has a first surface, a second surface opposite the first surface and four edges extending between the first and second surfaces. The first edge is opposite the third edge and the second edge is opposite the fourth edge. All four edges vary in thickness along their lengths. The third layer has a first surface, a second surface opposite the first surface and four edges extending between the first and second surfaces. The first and third edges are opposite each other and are of constant thickness along their lengths, with the thickness of the first edge being greater than the thickness of the third edge. The second and fourth edges are opposite each other and vary in thickness along their lengths. In one embodiment, the dimensions of the first layer are substantially the same as the dimensions of the third layer. In another embodiment, the thickness of the second edge of the first layer at any location along its length is substantially the same as the thickness of the fourth edge at the same location along its length.

According to another embodiment of the present invention, the thickness of the first edge of the second layer at a given distance from the fourth edge of the second layer is substantially the same as the thickness of the second edge of the second layer at the same distance from the third edge of the second layer. Additionally, the thickness of the third edge of the second layer at a given distance from the second edge of the second layer is substantially the same as the thickness of the fourth edge of the second layer at the same distance from the first edge of the second layer.

In another embodiment of the invention, the second surface of the first layer faces the first surface of the second layer and is parallel to the first surface of the second layer, the second surface of the second layer faces the first surface of the third layer and is parallel to the first surface of the third layer and the first surface of the first layer is parallel to the second surface of the third layer.

In another embodiment of the present invention, a transparent armor structure includes a first layer having a first planar surface and a second planar surface of substantially the same configuration as the first planar surface. The second planar surface is located opposite the first planar surface and is oriented such that it is not parallel to the first planar surface and such that corresponding locations on the first and second planar surfaces are displaced approximately 90 degrees from each other. In one embodiment, the armor structure further includes second and third layers. The second layer has a first surface and a second surface facing the first surface of the first layer and parallel to the first surface of the first layer. The third layer has first and second surfaces. The first surface faces the second surface of the first layer and is parallel to the second surface of the first layer. The first surface of the second layer and the second surface of the third layer are parallel.

Other features of the present invention will be apparent to those skilled in the art from the following detailed description of embodiments of the invention and the accompanying drawings.

DETAILED DESCRIPTION OF EMBODIMENTS OF THE INVENTION

Figure 1:
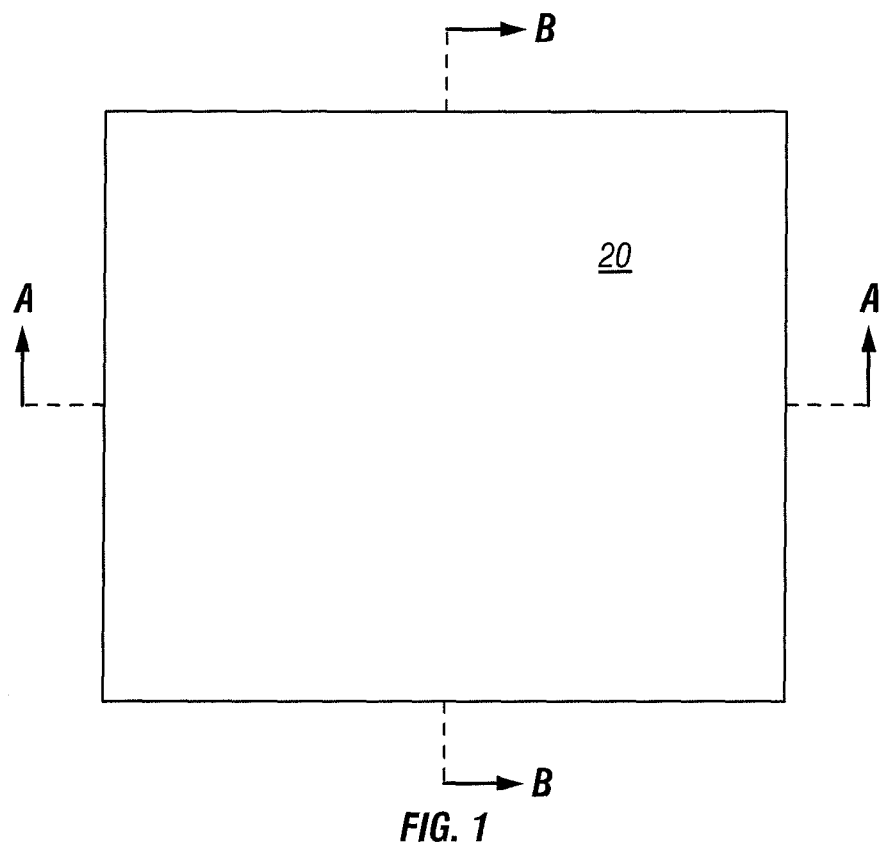
FIG. 1 is a plan view of a transparent armor structure according to one embodiment of the present invention.
Figure 2:
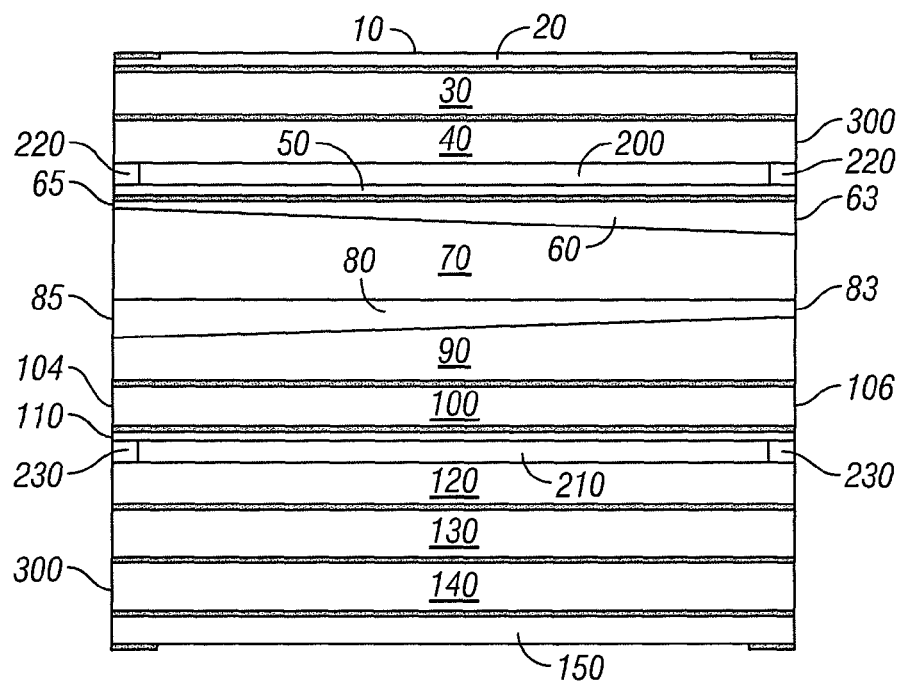
FIG. 2 is a cross-sectional view of the transparent armor structure of FIG. 1 taken along line A-A in FIG. 1.
Figure 3:
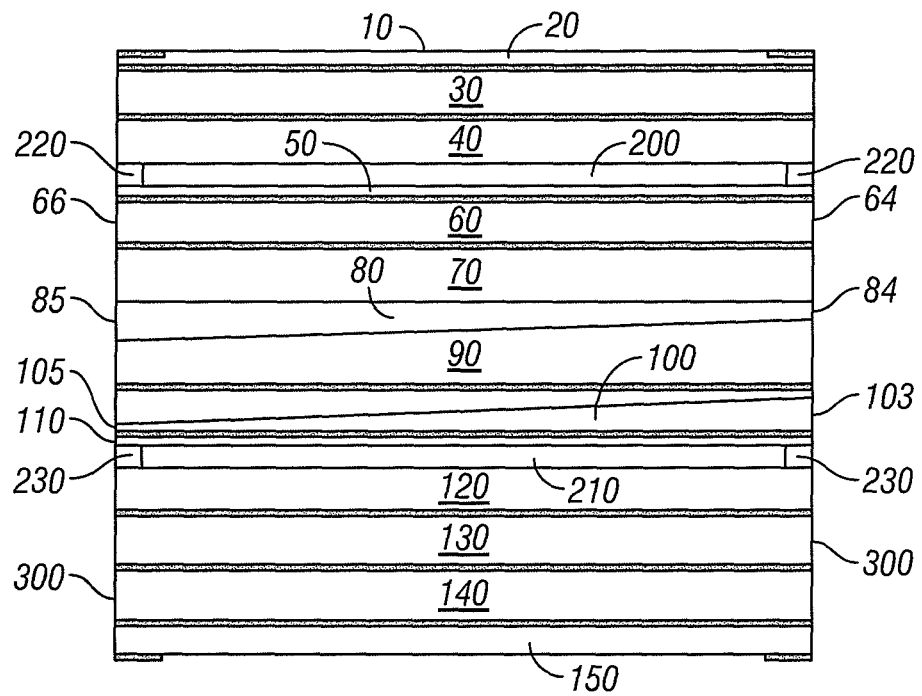
FIG. 3 is a cross-sectional view of the transparent armor structure of FIG. 1 taken along line B-B in FIG. 1.

FIG. 1 is a plan view of a transparent armor structure 10 according to one embodiment of the present invention as viewed from a first side or strike face 20. FIGS. 2 and 3 are cross-sectional views, taken along lines A-A of FIG. 1 and B-B of FIG. 1, respectively, of the transparent armor structure 10. In the embodiment shown, transparent armor structure 10 is a laminate having multiple layers of sheets of varying materials bonded together and including air gaps 200 and 210 between certain layers. As shown in FIGS. 2 and 3, first side or strike face 20 is backed by a plurality of layers 30-150.

In the embodiment shown, layers 20, 30, 40, 50, 70, 90, 110, 120, 130 and 140 are glass sheets. A variety of different types of glass can be utilized for layers 20, 30, 40, 50, 70, 90, 110, 120, 130 and 140. In one embodiment, layers 20, 50 and 110 are chemically strengthened glass and layers 30, 40, 70, 90, 120, 130 and 140 are borosilicate glass. In another embodiment, layers 20, 50 and 110 are alkali aluminosilicate glass and layers 30, 40, 70, 90, 120, 130 and 140 are borosilicate glass. In the embodiment shown, layers 20, 50 and 110 have the same thickness, which is constant. Layers 30, 40, 120, 130 and 140 are also of constant thickness. However, in the embodiment shown, layer 30 is thicker than layers 40, 120, 130 and 140. Furthermore, in the embodiment shown, layers 30, 40, 120, 130 and 140 are all thicker than layers 20, 50 and 110.

Layers 60, 80 and 100 are preferably made from a transparent polyurethane material. Although various polyurethane materials may be used, in one embodiment of the invention layers 60, 80 and 100 are made from an aliphatic polyurethane material and the layers have the following characteristics:

Surface Flatness—Total Indicator Reading (TIR)<Approximately 0.050"

Hardness—Shore D of Approximately 84-86

Haze<Approximately 0.5% (ASTM D1003)

Light Transmission (Tv)>Approximately 85% (ASTM D1003)

As described in greater detail below, layers 60, 80 and 100 are of varying thickness. Similarly, layers 70 and 90 disposed between layers 60, 80 and 100 are also of varying thickness as will be described in greater detail below.

Layer 150 is the innermost layer of transparent armor structure 10 and is disposed closest to the individual protected by transparent armor structure 10 in use. In the embodiment shown, layer 150 is preferably a polycarbonate material. Layer 150 functions as a spall layer.

A first air gap 200 is located between layer 40 and layer 50 and a second air gap 210 is located between layer 110 and layer 120. Air gaps 200 and 210 are of uniform thickness in a direction perpendicular to the field of view. A first seal 220 is disposed about the periphery of air gap 200 and a second seal 230 is disposed about the periphery of the second air gap 210. Seals 220 and 230 may take a variety of configurations. In one embodiment of the invention, seals 220 and 230 are swiggle seals.

The various layers of transparent armor device 10 may be laminated together in a number of manners and by use of various known laminating processes. In one embodiment of the present invention, aliphatic polyurethane film layers are disposed between the various layers described above and the assembly is autoclaved to bond the layers together.

Figure 4:
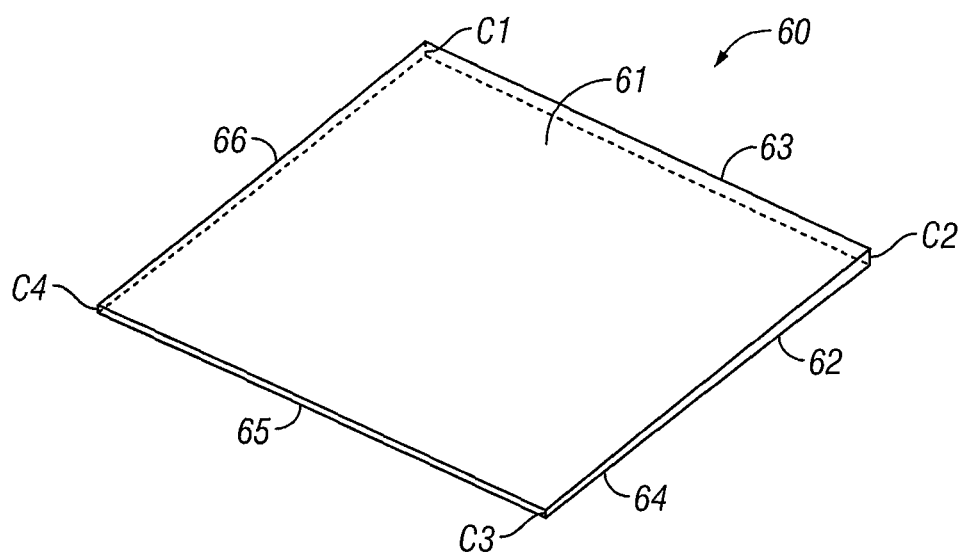
FIG. 4 is a perspective view of one of the layers that it a component of the armor structure of FIG. 1.

As noted above, layers 60, 80 and 100 are of varying thickness. FIG. 4 is a perspective view of layer 60. As shown in FIG. 4, layer 60 has a first surface 61, a second surface 62, a first edge 63, a second edge 64, a third edge 65 and a fourth edge 66. Sheet 60 has a first thickness at corner C1, a second thickness at corner C2, a third thickness at corner C3 and a fourth thickness at corner C4. In the embodiment shown, the thickness of layer 60 at corner C1 is equal to the thickness of layer 60 at corner C2. Additionally, the thickness of layer 60 at corner C3 is equal to the thickness of layer 60 at corner C4. The first surface 61 is disposed at an angle to second surface 62. Note that the thickness of the various layers of transparent armor structure 10 can vary depending on the size of the structure and the threat level to be defeated. The angles at which surfaces 61, 81, 82 and 101 are disposed with respect to strike face 20 can also vary. In one embodiment of the invention, these angles vary between less then about one degree and about 20 degrees.

Figure 5:
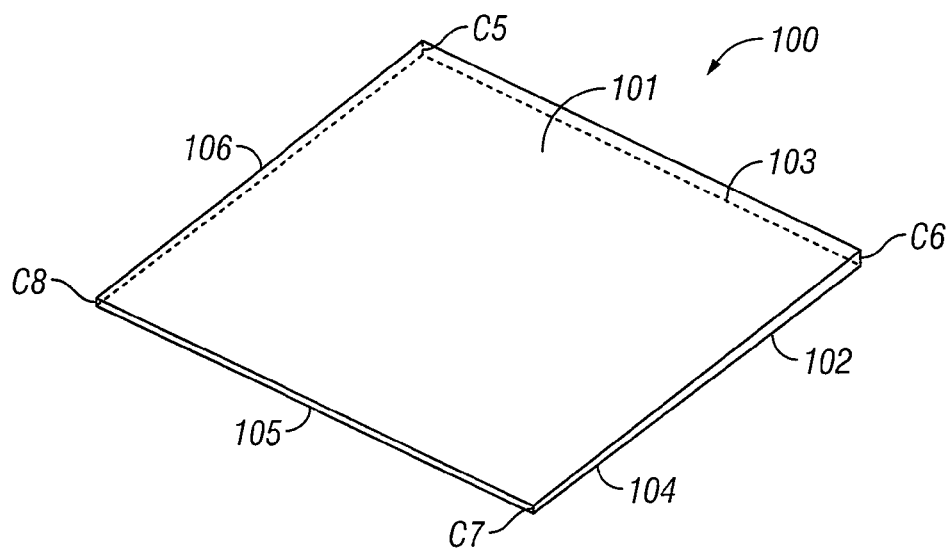
FIG. 5 is a perspective view of one of the layers that it a component of the armor structure of FIG. 1.

FIG. 5 is a perspective view of layer 100, which, in the embodiment shown, is identical to layer 60. Layer 100 has a first surface 101, a second surface 102, a first edge 103, a second edge 104, a third edge 105 and a fourth edge 106. Layer 100 has a first thickness at corner C5, a second thickness at corner C6, a third thickness at corner C7 and a fourth thickness at corner C8. In the embodiment shown, the thickness of layer 100 at corner C5 is equal to the thickness of layer 100 at corner C6. Additionally, the thickness of layer 100 at corner C7 is equal to the thickness of layer 100 at corner C8. First surface 101 is disposed at an angle to second surface 102.

Figure 6:
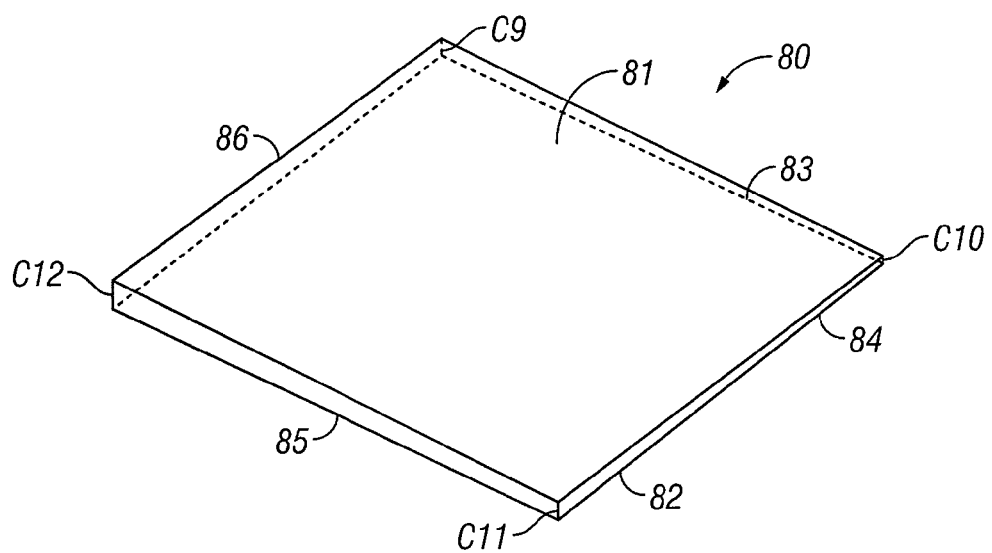
FIG. 6 is a perspective view of one of the layers that it a component of the armor structure of FIG. 1.
Figure 7:
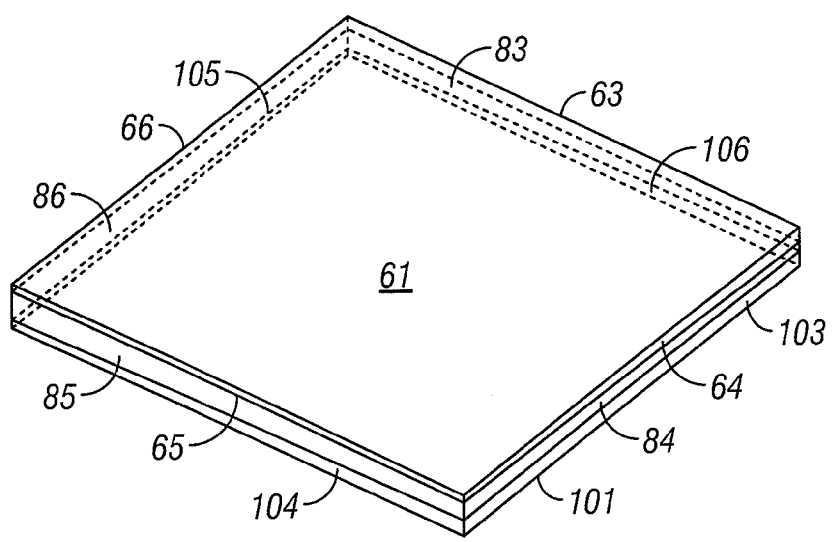
FIG. 7 is a perspective view illustrating the relationship among the varying thicknesses of the components shown in FIGS. 4, 5 and 6.

FIG. 6 shows a perspective view of layer 80. Layer 80 includes a first surface 81, a second surface 82, a first edge 83, a second edge 84, a third edge 85 and a fourth edge 86. Layer 80 has a first thickness at corner C9, a second thickness at corner C10, a third thickness at corner C11 and a fourth thickness at corner C12. In the embodiment shown, the thickness of layer 80 at corner C9 is equal to the thickness of layer 80 at corner C11. The thickness of layer 80 at corner C12 is greater than the thickness of layer 80 at the remaining corners and the thickness of layer 80 at corners C9 and C11 is greater than the thickness of layer 80 at corner C10.

Although layers 60, 80 and 100 can be manufactured in various thicknesses, the relationship between the layers is such that when layer 60 is positioned with edge 63 adjacent edge 83 and surface 62 contacting surface 81 and layer 100 is positioned such that edge 103 is adjacent edge 84 and surface 102 contacts surface 82, the layers 60, 80 and 100 form a stack having a constant thickness. As a result, the planar surface 82 is identical to planar surface 81 but is rotated 90 degrees from surface 81. This relationship is shown in FIG. 6. This is the manner in which layers 60, 80 and 100 are arranged in armor structure 10, although layer 70 is disposed between layers 60 and 80 and layer 90 is disposed between layers 80 and 100. Note also that surface 61 of layer 60 is parallel to surface 101 of layer 100 and that these surfaces face opposite directions when the layers are arranged in this manner.

As shown in FIGS. 2 and 3, layer 70 is configured to follow the contours of surface 62 of layer 60 and surface 81 of layer 80. Similarly, layer 90 is configured to follow the contours of surface 82 of layer 80 and surface 102 of layer 100.

The perimeter of transparent armor product 10 is bounded around its outer edge by a frame member 300. In one embodiment, the frame includes an aliphatic urethane material wrapped around the periphery of the various layers and bonded thereto. A generally U-shaped metal frame or other supporting structure can be positioned around the urethane material and bonded thereto.

Figure 8:
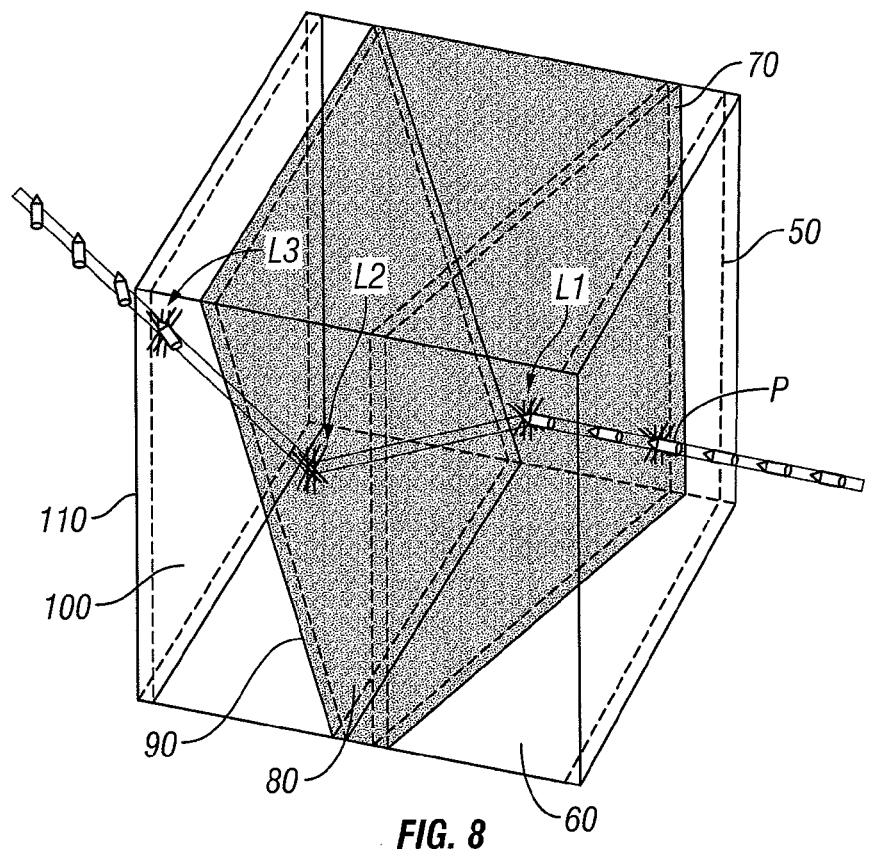
FIG. 8 is a perspective view of an exemplary travel path of a projectile as it passes through a section of the transparent armor structure of FIG. 1.

When a projectile P is fired at strike face 20 of transparent armor structure 10, it will be slowed and dissipate energy as it passes through strike face 20, layers 30 and 40, air gap 200 and layer 50. Typically, the metal jacket is stripped from the round as the projectile passes through these layers. As the projectile passes through layers 60, 70 and 80 as shown at location L1 in FIG. 8, the angled relationship of the surfaces causes projectile P to deflect and/or rotate. This will further reduce the velocity of the projectile P as it passes through layer 80. As projectile P passes through layers 80, 90 and 100 at location L2, it again deflects and/or rotates. This will again reduce the velocity of projectile P as it passes through layer 100. At this point, the projectile has been substantially slowed and significant energy has been dissipated as a result of the deflection/rotation of projectile P as shown at location L3. Further energy is dissipated as the projectile passes through layer 110, air gap 200 and into layers 120-150. The ultimate goal of transparent armor structure 10 is to slow projectile P and dissipate sufficient energy to capture projectile P within transparent armor structure 10.

Figure 9:
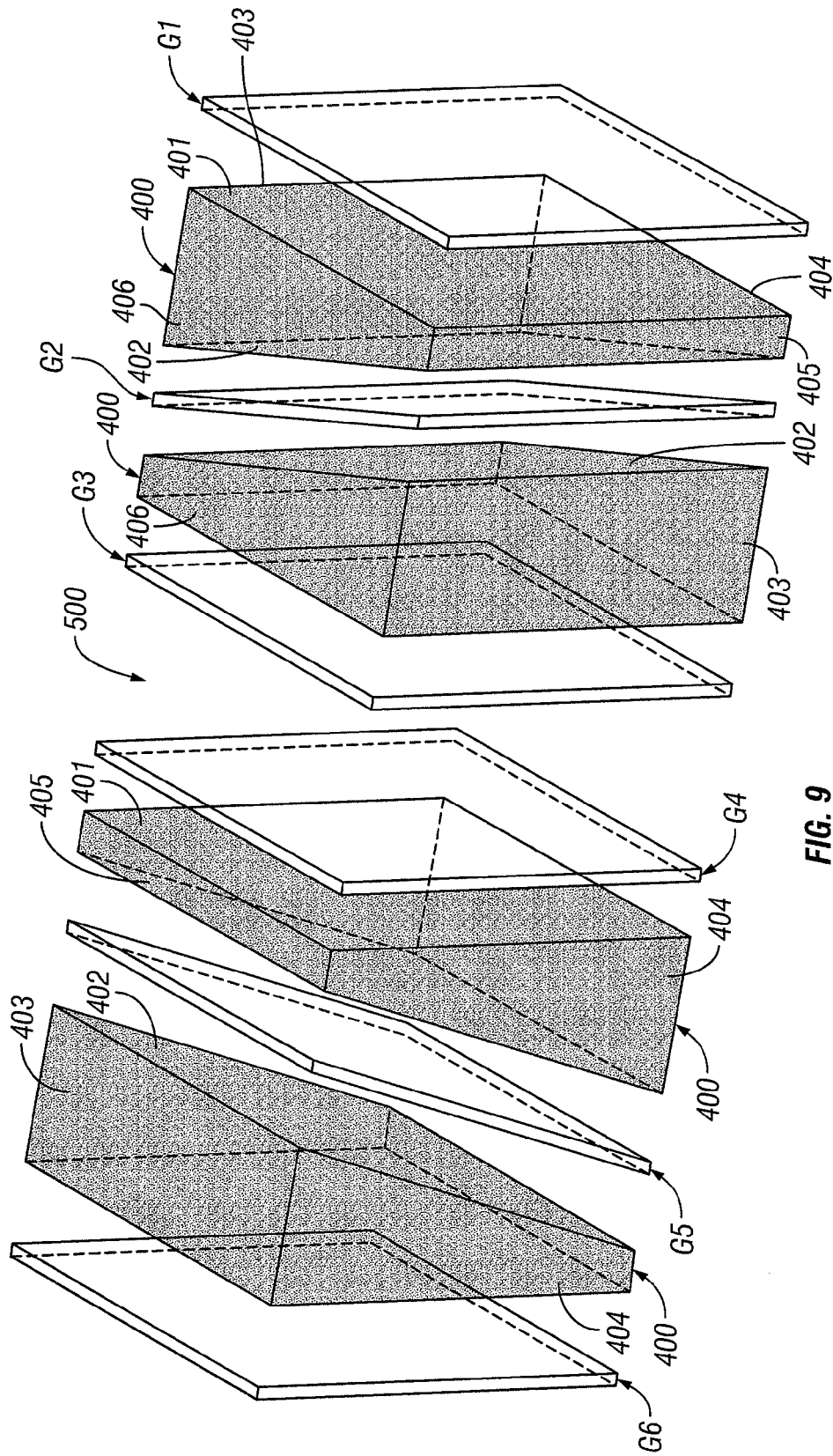
FIG. 9 is an exploded perspective view of a section of a transparent armor structure according to another embodiment of the present invention.

FIG. 9 is an exploded perspective view of an alternative embodiment of a section of the transparent armor structure 10 of FIG. 1. This section of the structure is intended to replace layers 50-110 of transparent armor structure 10. As shown in FIG. 9, this section of transparent armor structure 10 includes six glass layers G1, G2, G3, G4, G5 and G6 and four polyurethane layers 400. Each layer 400 includes a first surface 401, a second surface 402, a first edge 403, a second edge 404, a third edge 405 and a fourth edge 406. As shown in FIG. 9, the configuration of layers 400 are similar to that of layers 60 and 100 in that edges 403 and 405 are both of constant thickness with one edge, i.e., edge 403 having a greater thickness than the other edge, i.e., edge 405. In the embodiment shown, layers 400 are configured such that when two of them are positioned with their surfaces 402 in contact and rotated 180° with respect to each other, the resulting structure has a uniform thickness.

Figure 10:
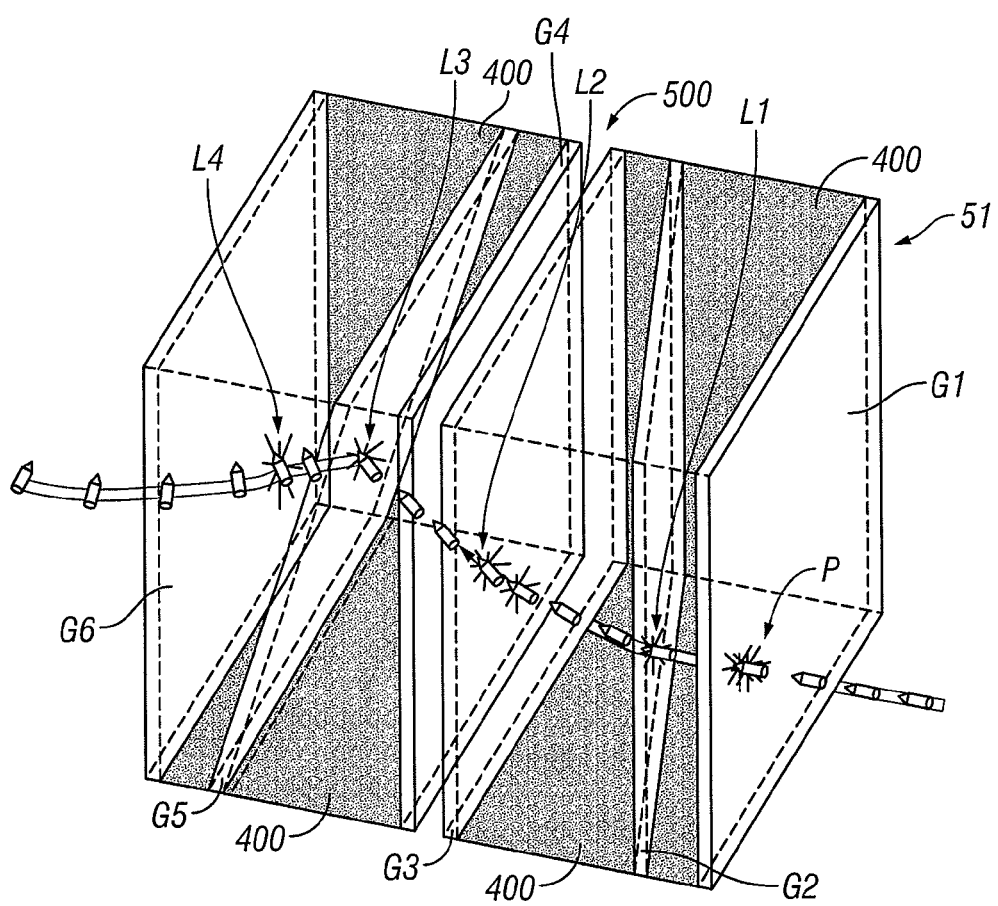
FIG. 10 is a perspective view illustrating an exemplary travel path of a projectile as it passes through the section shown in FIG. 9.

As shown in FIGS. 9 and 10, layer G1 is positioned against surface 401 of a first layer 400. Layer G2 is positioned adjacent surface 402 of that layer. The next layer 400 is rotated 180° with respect to the first layer 400 and positioned such that its second surface 402 is adjacent layer G2. Layer G3 is positioned adjacent first surface 401 of the second layer 400. In this manner, layers G1, G2, G3 and the two intervening layers 400 form a section S1 of uniform thickness. Similarly, the remaining layers 400 and layers G4, G5 and G6 likewise form a section S2 of uniform thickness. Although sections S1 and S2 are of the same thickness in the embodiment shown, they may have different thicknesses in other embodiments. Sections S1 and S2 are rotated 90° with respect to each other and are separated by an air gap 500.

As shown in FIG. 10, projectile P is deflected and/or rotated from a linear travel path by the non parallel interfaces at locations L1 and L3 in a manner similar to that described above. In this embodiment, further energy is dissipated as projectile P travels through air gap 5 at location L2. As with the prior embodiment, projectile P has been substantially slowed and significant energy has been dissipated as a result of the deflection/rotation of projectile P as shown at location L4.

Although the present invention has been shown and described in detail, the same is for purposes of illustration only and is not a limitation on the invention. Numerous modifications to the invention can be made. For example, the arrangement of the various layers can be altered. The materials from which the layers are formed can also be varied. Accordingly, the scope of the present invention is not limited to the specific embodiments discussed above.

I claim:

1. A transparent armor structure, including:
   a first layer of a first material;
   a second layer of a second material, the second layer positioned adjacent to the first layer;
   a third layer of a third material, the third layer having a first surface, a second surface opposite the first surface, a first edge face having a constant thickness and extending between the first and second surfaces, a second edge face extending between the first and second surfaces, a third edge face opposite the first edge face and having a constant thickness less than the thickness of the first edge face and extending between the first and second surfaces and a fourth edge face opposite the second edge face and extending between the first and second surfaces;
   an air gap between the second and third layers;
   a fourth layer of the second material, the fourth layer positioned adjacent to the second surface of the third layer;
   a fifth layer of the third material, the fifth layer positioned adjacent to the fourth layer, the fifth layer having a first surface, a second surface opposite the first surface, a first edge face having a varying thickness and extending between the first and second surfaces, a second edge face having a varying thickness and extending between the first and second surfaces, a third edge face opposite the first edge face and having a varying thickness and extending between the first and second surfaces and a fourth edge face opposite the second edge face and having a varying thickness and extending between the first and second surfaces;
a sixth layer of the second material, the sixth layer positioned adjacent to the fifth layer;
a seventh layer of the third material, the seventh layer having a first surface, a second surface opposite the first surface, a first edge face having a constant thickness and extending between the first and second surfaces, a second edge face extending between the first and second surfaces, a third edge face opposite the first edge face and having a constant thickness less than the thickness of the first edge face and extending between the first and second surfaces and a fourth edge face opposite the second edge face and extending between the first and second surfaces, the first surface of the seventh layer positioned adjacent to the sixth layer;
an eighth layer of the second material;
an air gap between the seventh and eighth layers; and
a ninth layer of a fourth material, the ninth layer positioned adjacent to the eighth layer.

2. The transparent armor structure of claim 1, wherein the first edge face of the seventh layer is oriented at a 90 degree angle with respect to the first edge face of the third layer.

3. The transparent armor structure of claim 1, wherein the dimensions of the third layer are substantially the same as the dimensions of the seventh layer.

4. The transparent armor structure of claim 2, wherein the first surface of the first layer and the second surface of the second layer are parallel.

5. The Transparent armor structure of claim 2, where in the second surface of the first layer and the first surface of the second layer are not parallel to each other.

6. The transparent armor structure of claim 1, wherein the thickness of the first edge face of the third layer is substantially the same as the thickness of the first edge face of the seventh layer.

7. The transparent armor structure of claim 2, wherein the first edge face of the seventh layer is oriented at a 90 degree angle with respect to the first edge face of the fifth layer.

8. The transparent armor structure of claim 3, wherein the combined thickness of the first edge face of the third layer, the first edge face of the fifth layer and the fourth edge face of the seventh layer is constant when the first edge face of the third layer is parallel to the first edge face of the fifth layer and the first edge face of the seventh layer is disposed at a 90 degree angle to the first edge face of the third layer.

9. The transparent armor structure of claim 8, wherein the combined thickness of the second edge face of the third layer, the second edge face of the fifth layer and the first edge face of the seventh layer is constant.

10. The transparent armor structure of claim 9, wherein the combined thickness of the third edge face of the third layer, the third edge face of the fifth layer and the second edge face of the seventh layer is constant.

11. The transparent armor structure of claim 10, wherein the combined thickness of the fourth edge face of the third layer, the fourth edge face of the fifth layer and the third edge face of the seventh layer is constant.

12. The transparent armor structure of claim 1, wherein the second surface of the third layer faces the first surface of the fifth layer and is parallel to the first surface of the fifth layer, the second surface of the fifth layer faces the first surface of the seventh layer and is parallel to the first surface of the seventh layer and the first surface of the third layer is parallel to the second surface of the seventh layer.

13. The transparent armor structure of claim 1, wherein the first material is a first type of glass and the second material is a second type of glass.

14. The transparent armor structure of claim 13, wherein the third material is a polyurethane.

15. The transparent armor structure of claim 14, wherein the fourth material is a polycarbonate.

16. A transparent armor structure, including:
a first layer having a first surface, a second surface opposite the first surface, a first edge face having a constant thickness along its length and extending between the first and second surfaces, a second edge face having a varying thickness along its length and extending between the first and second surfaces, a third edge face opposite the first edge face and having a constant thickness along its length less than the thickness of the first edge face and extending between the first and second surfaces and a fourth edge face opposite the second edge face and having a varying thickness along its length and extending between the first and second surfaces;
a second layer having a first surface, a second surface opposite the first surface, a first edge face having a varying thickness along its length and extending between the first and second surfaces, a second edge face having a varying thickness along its length and extending between the first and second surfaces, a third edge face opposite the first edge face and having a varying thickness along its length and extending between the first and second surfaces and a fourth edge face opposite the second edge face and having a varying thickness along its length and extending between the first and second surfaces; and
a third layer having a first surface, a second surface opposite the first surface, a first edge face having a constant thickness along its length and extending between the first and second surfaces, a second edge face having a varying thickness along its length and extending between the first and second surfaces, a third edge face opposite the first edge face and having a constant thickness along its length less than the thickness of the first edge face and extending between the first and second surfaces and a fourth edge face opposite the second edge face and having a varying thickness along its length and extending between the first and second surfaces.

17. The transparent armor structure of claim 16, wherein the dimensions of the first layer are substantially the same as the dimensions of the third layer.

18. The transparent armor structure of claim 16, wherein the thickness of the second edge face of the first layer at any location along its length is substantially the same as the thickness of the fourth edge face at the same location along its length.

19. The transparent armor structure of claim 16, wherein the thickness of the first edge face of the second layer at a given distance from the fourth edge face of the second layer is substantially the same as the thickness of the second edge face of the second layer at the same distance from the third edge face of the second layer.

20. The transparent armor structure of claim 19, wherein the thickness of the third edge face of the second layer at a given distance from the second edge face of the second layer is substantially the same as the thickness of the fourth edge face of the second layer at the same distance from the first edge face of the second layer.

21. The transparent armor structure of claim 16, wherein the second surface of the first layer faces the first surface of the second layer and is not parallel to the first surface of the second layer, the second surface of the second layer faces the first surface of the third layer and is parallel to the first surface of the third layer and the first surface of the first layer is parallel to the second surface of the third layer.

22. The transparent armor structure according to claim 16, wherein the first edge face of the third layer is oriented at a 90 degree angle with respect to the first edge face of the first layer.

* * * * *